United States Patent [19]

Wagner et al.

[11] Patent Number: 4,463,108

[45] Date of Patent: Jul. 31, 1984

[54] PRECIPITATED SILICA PIGMENT FOR SILICONE RUBBER

[75] Inventors: Melvin P. Wagner; Joseph P. Tultz, both of Barberton; Thomas G. Krivak, Akron, all of Ohio

[73] Assignee: PPG Industries, Inc., Pittsburgh, Pa.

[21] Appl. No.: 407,183

[22] Filed: Aug. 11, 1982

Related U.S. Application Data

[63] Continuation-in-part of Ser. No. 279,369, Jul. 1, 1981, abandoned.

[51] Int. Cl.$^3$ .............................................. C09C 1/28
[52] U.S. Cl. ................................... 523/216; 106/306; 106/308 B; 423/339; 524/492; 524/588
[58] Field of Search .................... 423/339; 106/308 B, 106/306; 523/209, 216; 524/588

[56] References Cited

U.S. PATENT DOCUMENTS

| 2,940,830 | 6/1960 | Thornhill | 423/339 |
| 3,928,541 | 12/1975 | Wason | 423/339 |
| 3,960,586 | 6/1976 | Wason | 423/339 |
| 4,157,920 | 6/1979 | Wason et al. | 423/339 |
| 4,159,280 | 6/1979 | Wason | 424/52 |
| 4,202,813 | 5/1980 | Wason | 423/339 |
| 4,244,707 | 1/1981 | Wason | 423/335 |
| 4,280,822 | 7/1981 | Wason | 423/335 |

FOREIGN PATENT DOCUMENTS

| 156807 | 3/1952 | Australia | 523/216 |
| 751308 | 1/1967 | Canada | 423/339 |
| 721961 | 1/1955 | United Kingdom | 423/339 |

OTHER PUBLICATIONS

"Micro-Fine Silicas Handle Easily", Chemical Processing, Jan. 27, 1964, pp. 1-2.

*Primary Examiner*—Helen M. McCarthy
*Attorney, Agent, or Firm*—Irwin M. Stein

[57] ABSTRACT

Amorphous precipitated high structure silica pigment useful in the reinforcement of silicone rubber is described. The silica pigment is treated with an aqueous solution of a metal, e.g., calcium and barium, which forms a relatively water insoluble, white or colorless sulfate salt in amounts sufficient to provide at least an equal molar amount of the metal compared to the amount of alkali metal in the silica. Silicone rubber reinforced with such silica pigment exhibits a water swell of less than 4 volume percent.

22 Claims, No Drawings

PRECIPITATED SILICA PIGMENT FOR SILICONE RUBBER

This application is a continuation-in-part of our application U.S. Ser. No. 279,369, filed July 1, 1981, now abandoned, for Precipitated Silica Pigment For Silicone Rubber.

DESCRIPTION OF THE INVENTION

Non-reinforced vulcanized silicone elastomers have a relatively low tensile strength; hence, they require reinforcement with particulate fillers to exhibit useful mechanical properties. Amorphous fumed silica, which is produced by oxidation of silicon tetrachloride at high temperatures, is the primary reinforcing filler used in silicone rubber due to its high degree of purity, particle size and thermal stability.

Amorphous precipitated hydrated silica, which is widely used as a filler for other organic rubbers, such as styrene-butadiene rubbers, is not used extensively in silicone rubbers because of its higher water and electrolytes content. Silicone rubbers filled with precipitated silica are generally inferior to fumed silica-filled silicone rubber in the properties of dielectric strength and water swell. Consequently, precipitated silica has been used in silicone rubbers mainly as a secondary filler in combination with fumed silica or in applications in which electrical properties and water swell are not critical.

Precipitated silicas are most commonly produced by neutralizing an aqueous solution of an alkali metal silicate, usually sodium silicate, with an inorganic acid, i.e., carbonic acid, hydrochloric acid, or sulfuric acid. The level of impurities, e.g., electrolytes, in precipitated silica depends to a large extent on the raw materials used in the manufacturing process and the degree of washing of the product. Water soluble alkali metal, e.g., sodium, inorganic salts (electrolytes) generally constitute the largest single impurity in precipitated silica. These salts can be exemplified by sodium chloride, sodium sulfate, sodium carbonate, and sodium bicarbonate, and such salts can be present alone or in various combinations and amounts in precipitated silica. The sulfate salt is considered to be particularly detrimental to the development of a low value for percent water volume swell in silicone rubber. The aforesaid salts are generated by the acid-base reaction which occurs during precipitation. Their presence in silica that is used to reinforce silicone rubbers contributes to higher percent water swell and lower dielectric strength values for such rubbers compared to silicone rubbers in which fumed silica is used as the reinforcing filler.

Conventional washing of precipitated silica during the manufacturing process removes a portion of the soluble alkali metal inorganic salts incorporated therein; but, the level of such salts in the typical amorphous precipitated hydrated silica product still can range from 1 to 4 or 5, e.g., 1 to 3 weight percent. Further reduction of the soluble inorganic salt level in the silica can be accomplished by additional extensive washing with electrolyte-free water or by passing an aqueous slurry of the silica through beds of ion exchange resins. However, such techniques add significantly to the manufacturing cost.

It has now been discovered that amorphous, precipitated hydrated silica useful for reinforcing silicone rubber can be produced without the additional washings with water (or use of ion exchange resins) required to reduce the amount of soluble inorganic salt impurities, e.g., sodium chloride and sodium sulfate, found in the typical commercial product to very low levels e.g., less than 0.6 weight percent. More particularly, it has been found that treatment of the surface of the precipitated silica with small amounts of water soluble compounds of certain metals offsets the otherwise adverse affect that the chloride and sulfate alkali metal soluble salts present in the silica have with respect to water swell, and also benefits dielectric strength, when thus treated silica is incorporated into silicone rubber. The metals considered to be so useful are those which form relatively water-insoluble white or colorless sulfate salts, e.g., calcium and barium. The amount of metal required to treat the silica to produce the desired beneficial result is related to the amount of alkali metal inorganic salt impurities in the silica, notably the chloride and sulfate salts, and is particularly related to the total amount of alkali metal, e.g., sodium, present in the silica.

DETAILED DESCRIPTION

In accordance with the present invention, there is provided a finely-divided, amorphous precipitated hydrated silica containing minor added amounts of a metal cation that forms a relatively water insoluble white or colorless sulfate salt. The silica contains at least 80 or 85, preferably at least 90, more preferably 93–97, weight percent $SiO_2$ on an anhydrous basis, i.e., including bound water. The aforesaid unmodified (without the added metal cation) amorphous precipitated hydrated silica can be prepared by reaction of an aqueous solution of a soluble silicate, e.g., sodium, lithium or potassium silicate, most usually sodium silicate, with inorganic mineral acid, most notably carbonic acid, sulfuric acid or hydrochloric acid. This method is suitably described in U.S. Pat. No. 2,940,830. Such silica contains bound water (about 2 to 5 weight percent) and adsorbed water (about 3 to 7 weight percent) in varying amounts, the latter depending partly upon the prevailing relative humidity. Adsorbed water is that water which is removed from the silica by heating at 105° C. for 24 hours at atmospheric pressure in a laboratory oven. Bound water is that water which is removed by additionally heating the silica at calcination temperatures, e.g., 1000° C.–1200° C.

The silica can have an ultimate particle size in the range of from 5 to 100 nanometers, usually between 5 and 40, more usually between 15 and 30 nanometers. Preferably, the ultimate particle size is about 20 nanometers. The BET surface area of the silica, as measured using nitrogen gas, can be in the range of 75 to 600 square meters per gram ($m^2/g$), but usually is in the range of 75 to 250, more usually in the range of 120 to 160 $m^2/g$. The BET method of measuring surface area is described in the Journal of the American Chemical Society, Vol. 60, page 309 (1938).

The amorphous precipitated silica treated in accordance with the present invention is a reinforcing silica, i.e., it is useful as a reinforcing filler or pigment for organic solids, particularly in rubber compositions used for tires and shoe soling. Such reinforcing pigments have also been referred to in the art as high structure silica because of the high percentage of water (sometimes referred to as structural water) associated with the filter cake obtained during production of reinforcing precipitated amorphous silica. High structure silicas are those in which the percent water in the filter cake is from about 70 to 85 weight percent. Silicas holding less than 70 weight percent, e.g., about 50 to 70 weight percent are referred to in the art as low structure silicas. See, for example, U.S. Pat. No. 4,157,920 (column 4, lines 29-40).

The total structural water content is an important property of silica pigments and is directly related to the functional end use properties of silica. Thus, high structure silicas find a principal end use as reinforcing fillers in elastomers and rubber because they exhibit physical properties such as high structure, low valley abrasion and low pack density. In contrast, low structure silicas are not useful as reinforcing fillers because they exhibit the physical properties of low structure, high abrasion, and high pack density. Low structure silicas have a particular utility as an abrasive or polishing agent for dentrifice compositions.

The high structure amorphous, precipitated silica of the present invention used to reinforce silicone rubber will typically have a water soluble sulfate salt content of less than about 2, preferably less than 1, weight percent; a water soluble chloride salt content of less than about 1, preferably less than about 0.5, weight percent; and an alkali metal, e.g., sodium oxide content of from about 0.05 to 5 weight percent, preferably less than 2, more preferably less than 1, weight percent. The total collective content of soluble sulfate and chloride salts and alkali metal oxide, e.g., sodium oxide in such silica will preferably range between about 1 and about 3 weight percent, more preferably less than about 2.5 weight percent. The aforesaid levels of chloride and sulfate salts, and sodium oxide are determined by analysis of the silica for chlorine, sulfur, and sodium by X-Ray fluorescence spectroscopy. The amount of chlorine, sulfur and sodium are reported respectively as sodium chloride, sodium sulfate, and sodium oxide, basis the precipitated silica.

The amount of the metal with which the surface of the reinforcing precipitated silica is treated will depend upon and be in response to analyses for the amount of alkali metal, e.g., sodium, (usually expressed as the metal oxide) and chlorine and sulfur present in the untreated precipitated silica, particularly the total amount of alkali metal present therein. In accordance with the present invention, a sufficient amount of the selected metal is added to the surface of the untreated precipitated silica to produce a silica product which, when incorporated as the principal silica filler in a silicone rubber, produces a reinforced silicone rubber having a water volume swell of not more than 4, preferably less than 2, and more preferably less than 1, percent.

In one embodiment, at least about a molar equivalent of the metal basis the alkali metal (calculated on the basis of the atomic weights of the respective elements or their common stable oxides) is used to treat the silica. Typically, more than a molar equivalent of the metal is used, e.g., a molar equivalent ratio of metal to alkali metal of from about 1:1 to about 2:1, more typically from about 1:1 to 1.5:1. As used herein the "total amount" of alkali metal present in the silica is intended to mean the total alkali present, i.e., the sum of the analyses for alkali reported as the sulfate and chloride salts and as the oxide.

Metals considered to be useful in the practice of the present invention are those which form relatively water-insoluble, white or colorless sulfate salts. Typically, the sulfate salts of such metals will have a solubility of less than 1, preferably less than 0.75, more preferably less than 0.3, grams per 100 cubic centimeters of cold (0° C.-30° C.) water. Exemplary of such metals include: calcium, barium, lead, silver, strontium, and titanium. Mixtures of such metals can also be used, if desired. The amount of metal added to the precipitated silica can be determined by X-Ray fluorescence spectroscopy and is usually reported as the metal oxide. In calculating the amount of metal cation to be added, the amount of such metal cation to be added already present in the precipitated silica from impurities in the reagents (including water) used to prepare the silica may be taken into account. Calcium and barium are preferred as the metal cations to be added.

Calcium is the more preferred of the metals that can be used to treat the silica surface because of its relative cost, availability and low molecular weight. The amount of calcium, expressed as the oxide (CaO), present on the silica will vary from at least 0.45 to about 3, more usually from about 0.5 to 3, and more typically from about 0.5 to 2, weight percent, basis the untreated precipitated silica. The amounts of other metals, e.g., barium, that are used will be equivalent on a mole basis to that described with respect to calcium. On a weight basis, the amounts of other metals used will be in proportion to the ratio of their molecular weights to calcium. For example, the amount of barium required will be about 3.4 (137/40) times the quantity by weight of calcium required. Similarly, the amount by weight of lead, silver, strontium and titanium required will be about 5.2, 2.7, 2.2, and 1.2 times the amount required for calcium.

The interrelationship between the alkali metal, e.g., sodium, sulfur and chlorine, in the precipitated silica and percent water swell can be determined by the well-known technique of multiple regression analysis. When the metal used is calcium, the linear model which describes the percent water volume swell as a function of the ionic form of such elements is the expression:

$$\% \text{ Water Swell} = S = C_1[Cl^-] + C_2[SO_4^=] + C_3[Na^+] + C_4[Ca^{++}] \quad (1)$$

wherein $C_1$, $C_2$, $C_3$ and $C_4$ are numerical regression coefficients and $[Cl^-]$, $[SO_4^=]$, $[Na^+]$, and $[Ca^{++}]$ are the weight percents of those ions in the precipitated silica expressed as sodium chloride (NaCl), sodium sulfate ($Na_2CO_4$), sodium oxide ($Na_2O$) and calcium oxide (CaO), respectively. The above expression (1) can be used to estimate percent water volume swell of a silicone rubber reinforced with a high structure silica.

In the above expression, the numerical coefficients for $C_1$, $C_2$, $C_3$ and $C_4$ can vary. $C_1$ varies from 8 to 12, e.g., 10; $C_2$ varies from 1 to 3, e.g., 2; $C_3$ varies 9.5 to 14.5 e.g., 12; and $C_4$ varies from −5.5 to −8.5, e.g., −7. Thus, increasing the chloride, sulfate and/or sodium ion content of a precipitated silica will increase the percent water volume swell of a silicone rubber containing such a modified silica, whereas increasing the calcium ion content of a precipitated silica will decrease the percent water volume of a silicone rubber containing that modified silica.

The relationship of the concentrations (by weight) of chloride, sodium, and sulfate anion, reported as sodium chloride, sodium oxide and sodium sulfate respectively, and the concentration of the calcium cation, reported as calcium oxide, in the precipitated silica for a calculated percent water swell of 4% or less can be expressed by the ratio, $$\frac{4 - C_1[Cl^-] - C_2[SO_4^=] - C_3[Na^+]}{C_4} \leq [Ca^{++}] \quad (2)$$

wherein $C_1$, $C_2$, $C_3$, $[Cl^-]$, $[SO_4^=]$, $[Na^+]$ and $[Ca^{++}]$ are as defined above. When a metal other than calcium is used, the coefficient, $C_4$, is multiplied by the ratio of molecular weights, i.e., 40/M, wherein M is the atomic weight of the other metal. The above ratio (2) can be used to estimate the amount of metal cation, e.g., $Ca^{++}$, required to obtain 4 percent or less of water volume swell in silicone rubber.

The precipitated silica of the present invention imparts mechanical and electrical properties to silicone rubber that approach those attained with fumed silica. In particular, silicone rubber having a percent water volume swell of less than 4, often less than 3 can be obtained using precipitated silica of the present invention. Silicone rubber having a percent water volume swell of 1 percent or less has been obtained using such treated precipitated silica.

The electrical properties of a silicone rubber are typically expressed in terms of the rubber's dielectric strength (wet and dry). Wet dielectric strength values of at least 400 volts/mil, e.g., at least 435 volts/mil, for dielectric strength are desired for applications requiring good electrical characteristics. Dielectric strength and percent water volume swell are not parallel properties, i.e., a low value for volume swell does not necessarily equate to a high value for dielectric strength. However, it has been found that, in general, the addition of the aforesaid metals to the surface of the precipitated silica in the aforesaid described amounts benefits both the dielectric strength and the percent water volume swell of a silicone rubber incorporating such silica compared to a silicone rubber incorporating the untreated silica.

Reinforcing, high structure silica of the present invention can be produced by treating amorphous, high structure precipitated silica with an aqueous solution of a compound of the aforementioned metals. For example, the precipitated silica filter cake can be dispersed in an aqueous solution containing the metal compound in that solution, washed with a solution of the metal compound; or silica powder can be dispersed in a substantially electrolyte free aqueous medium, recovered, e.g., by filtration, and the filter cake washed with an aqueous solution of the metal compound or dispersed in said aqueous solution. Other equivalent methods known to the skilled artisan for treating a solid, finely-divided particle with an aqueous metal cation-containing solution can also be used. The aforesaid treatments, i.e., washing, dispersing, etc. can be repeated several times as necessary to treat the silica with the desired quantity of the selected metal. The metal cation of the metal compound, e.g., calcium or barium, is adsorbed on the surface of the silica. It is believed that the adsorbed metal is present as polybasic cations or extremely small positively charged colloidal metal oxide particles.

It is contemplated that the above-described treatment can be accomplished by modifying the recovery steps in the conventional wet process for manufacturing amorphous, hydrated precipitated silica. In the aforesaid process, an aqueous slurry of crude precipitated silica is produced. The crude precipitated silica slurry is washed with water one or more times and then separated from the aqueous suspending medium, e.g., by filtration. The wet silica cake, e.g., filter cake, is dried and milled to a finely-divided product. In accordance with one embodiment of the present invention, the wet silica recovered from the aqueous slurry, e.g., the filter cake, is washed one or more times with metal cation-containing water and then, if desired, with distilled or deionized water. The treated and washed silica is dried and milled in the manner known in the art.

In a further embodiment, the aqueous slurry of crude precipitated silica is diluted (one or more times) with an equal volume of distilled or deionized water to wash the silica and the washed silica diluted with an equal volume of metal cation-containing water. While the concentration of silica in the resulting slurry can vary, the concentration should be sufficiently dilute to allow intimate contact between the particles of silica and water or metal cation-containing water. Typically, the slurry will have a silica concentration of about 5 weight percent. The diluted slurry is filtered and the filter cake washed at least once with distilled or deionized water or, if required, with the metal cation-containing water. The washed filter cake of treated silica is then dried and milled.

Thus, the crude precipitated silica product can be washed successively with distilled or deionized (demineralized) water until the chloride and sulfate ions are reduced to within the aforedescribed normal commercial ranges such that subsequent washings with metal cation-containing water will place sufficient metal cation on the silica and thereby provide a precipitated silica which when incorporated into silicone rubber yields a material with low percent water volume swell.

Alternatively, the crude silica can be washed or slurried with the aqueous metal cation-containing solution so that soluble chloride and sulfate salts are removed from the silica while simultaneously maintaining or depositing the desired level of metal cation on the silica. The concentration of the various ions on the silica can be determined by X-Ray fluorescence spectroscopy of dried samples of the treated silica.

The aqueous metal cation-containing solution can be prepared by dissolving a metal cation-containing compound (to the extent of its solubility) in the diluting or wash liquor. The amount of such liquor used depends to a large extent on the amount of chloride and sulfate soluble salts and alkali metal present in the silica, and the amount of metal cation, e.g., calcium required to produce a treated, amorphous precipitated high structure silica which when incorporated in silicone rubber provides a product having a water volume swell of less than 3 or 4, preferably less than 2, e.g., less than 1 percent. In a preferred embodiment, the treated high structure silica has a percent water volume swell of less than 2 percent, more preferably less than 1 percent and a wet dielectric strength of at least 400 volts/mil.

The metal compound used to form the metal cation-containing wash water or diluting water can be the metal oxide or hydroxide of the selected metal or any other inorganic or organic compound of the selected metal which when mixed with water hydrolyzes to form the metal oxide. Preferably, the solution of the metal compound does not introduce further anionic species, e.g., sulfate and chloride, into the silica as such anions tend to increase the percent water volume swell. Moreover, care should be taken to observe that the solution of the metal compound does not introduce significant quantities of cationic species other than those specified since they may adversely effect the wet dielectric strength or percent water volume swell. Aluminum, for example, tends to decrease the wet dielectric strength. Examples of compounds that may be used include: the ionizable inorganic oxide, hydroxide or salts of the metals and the ionizable metal salts of $C_1$–$C_4$ carboxylic acids, e.g., calcium oxide, calcium hydroxide, barium carbonate, barium hydroxide, barium oxide, calcium acetate, and calcium formate.

The treated precipitated silica of the present invention is incorporated into a silicone elastomer gum in amounts sufficient to reinforce the silicone rubber when cured, i.e., reinforcing amounts. Typically, the amount of treated precipitated silica used will range from about 10 to about 100, more usually from 20 to 70, preferably 30 to 60, parts of silica per 100 parts of silicone elastomer gum.

As the silicone elastomer gum, there can be used any of the silicone gums known in the art which are cured, i.e., crosslinked, to a silicone rubber by means of a free-radical generator. Examples of silicone gums include the methyl, vinyl, phenyl, methyl vinyl, methyl phenyl and fluorinated silicone gums.

Free-radical generators used to catalyze the curing (crosslinking) of the silicone gums are organic peroxides and gamma or high energy electron radiation. Exemplary of the organic peroxides commonly used are benzoyl peroxide, bis(2,4-dichlorobenzoyl) peroxide, 2,5-dimethyl-2,5-di(t-butylperoxy) hexane, t-butyl peroxybenzoate, and dicumyl peroxide. The peroxide is typically used in amounts of from 0.2 to 1.0 part per 100 parts of gum.

In addition to the precipitated filler and free-radical generator, the silicone gum can contain other additives such as processing aids (0–12 parts/100 parts of gum), silane additive (0–1 part/100 parts gum), colorants, heat stabilizers, plasticizers, etc. All the ingredients (except the peroxide) are mixed in equipment such as a Banbury internal mixer or a Sigma mixer until uniform. The mixture is then cooled, if necessary, and the peroxide catalyst added. The catalyzed mixture is then cured in a manner known in the art. Typically, the mixture is cured at about 170° C. for 10 to 15 minutes. Post cures of 1–4 hours at about 250° C. are also used.

The following examples are intended as illustrative of the invention and its preferred embodiments. All parts and percentages in said examples are by weight unless otherwise indicated.

EXAMPLE 1

Twenty liters of an aqueous slurry containing about 100 grams per liter of crude precipitated high structure silica produced by acidulation of an aqueous solution of sodium silicate with carbon dioxide was charged to a 100 liter stainless steel vessel and diluted with eighty liters of distilled water. A settling aid (a moderate molecular weight polycationic polymer) in the amount of 0.4 weight percent, basis the $SiO_2$, was added to the tank and the slurry heated to 70° C. The slurry was allowed to stand overnight at 65°–70° C. The supernatant liquid in the tank was pumped off the next morning leaving about thirty six liters of settled slurry. Distilled water was added to the tank a second time to a total volume of 100 liters. The slurry was heated with stirring to 70° C. and allowed to age at that temperature for six hours. Thereafter, the second supernatant liquid was pumped off and the tank refilled with distilled water. The slurry was stirred while being heated to 70° C. and allowed to stand overnight at 65°–70° C. The third supernatant liquid was pumped off the following morning and the pH of the remaining settled slurry adjusted to 3.7 with 5 Normal sulfuric acid. The acidified slurry was heated to 95° C. and aged for one hour with stirring. The heat aged slurry, which had a pH of 6.0, was filtered to obtain 17,500 grams of filter cake.

The filter cake was reslurried and diluted with sixty one liters of distilled water saturated with calcium oxide. The slurry was stirred while being heated to 70° C. and then aged for 30 minutes. The hot slurry was filtered and the filter cake reslurried again with calcium oxide saturated distilled water to a total volume of 100 liters. The slurry had a pH of 9.9, which was lowered to 5.5 with dilute sulfuric acid, and then aged for 30 minutes at 70° C. The hot slurry was filtered and the filter cake dried at 140° C. in a rotary drier.

The dried silica had a BET surface area of 138 $m^2$/gram. The pH of a 5% slurry of the silica was 6.8. The silica was analyzed for chloride ion, sulfate ion, sodium ion and calcium ion by X-Ray fluorescence spectroscopy using a model XRD-410 automated X-Ray spectrograph. The spectrograph employs a dual target X-Ray tube (tungsten/chromium) operating at 60 kilovolts and 50 milliamperes for excitation of the minor and trace element spectra. The dried silica was found to contain 2.43 percent sodium sulfate, 0.00 percent sodium chloride, 0.49 sodium oxide and 1.18 percent calcium oxide.

A silicone rubber was prepared by mixing sixty parts of the aforesaid dried precipitated silica with 100 parts of a methyl vinyl silicone gum (SWS Silicone Corp.-C-155) having a specific gravity of 0.98 and 6 parts of a plasticizer. 0.5 parts of a powdered peroxide (2,5-dimethyl-2,5-di(t-butylperoxy)hexane having 45% active peroxide was added and the mixture was press cured at 170° C. for 15 minutes. The rubber was given a post cure of 1 hour at 250° C. in a laboratory oven.

The resulting silicone rubber was tested for water volume swell in accordance with ASTM Method D-471, and dielectric strength in accordance with ASTM Method D-149. The percent volume swell obtained was 1.0 percent. The dielectric strengths obtained were 408 (dry) and 427 (wet) volts/mil.

EXAMPLE 2

Fourteen thousand grams of a precipitated high structure silica filter cake obtained by filtering an aqueous slurry of precipitated silica prepared by neutralization of an aqueous solution of sodium silicate with carbon dioxide followed by post acidification to a pH of 3.7 with sulfuric acid was reslurried in twenty liters of distilled water. Ten liters of distilled water containing 33.3 grams of concentrated sulfuric acid was then added to the agitated slurry. The stirred slurry was heated to 70° C. and aged for 30 minutes. The aged slurry, which had a pH of 2.8, was filtered. The filter cake was reslurried in thirty liters of distilled water and the slurry heated to 70° C. and aged for 30 minutes. The hot slurry, which had a pH of 3.3 was filtered. This filter cake was reslurried in thirty liters of distilled water saturated with calcium oxide. The slurry was heated to 70° C. and aged thirty minutes. The aged slurry, which had a pH of 8.5, was filtered and the filter cake dried at 140° C. in a rotary drier. The final dried product had a BET surface area of 133 $m^2$/gram. A 5% slurry had a pH of 7.3. The dried silica product was analyzed for sulfate, chloride, sodium and calcium ion by X-Ray fluorescence spectroscopy in accordance with the method described in Example 1. Results obtained were 0.07% sodium sulfate, 0.01% sodium chloride, 0.56% sodium oxide, and 1.34% calcium oxide.

The dried silica product was incorporated into a silicone gum in the manner and amount described in Example 1 except that the silicone gum mixture was press cured for 10 minutes @ 170° C. instead of 15 minutes. The silicone rubber was tested for water volume swell and dielectric strength. Results obtained were: 0.4 percent water volume swell and 419 (dry) and 421 (wet) volts/mil for dielectric strength.

EXAMPLE 3 (COMPARATIVE)

Three lots of untreated precipitated high structure silica produced by the conventional wet process were incorporated separately into a silicone gum in the amount and manner described in Example 1 except that 0.8 parts of the powdered peroxide was used. The silica-silicone gum mixtures were cured to a silicone rubber by press curing for 10 minutes at 170° C. followed by a post cure for 1 hour in a 250° C. oven. The rubbers were tested for water volume swell. Table I is a tabulation of data obtained for these samples.

TABLE I

| Lot | Surface Area m²/g | pH | NaCl Wt. % | Na₂SO₄ Wt. % | Na₂O Wt. % | CaO Wt. % | Water Swell % |
|---|---|---|---|---|---|---|---|
| A. | 139 | 7.06 | 0.05 | 2.18 | 1.08 | 0.44 | 13.0 |
| B. | 149 | 6.89 | 0.06 | 2.00 | 1.13 | 0.38 | 12.5 |
| C. | 150 | 7.00 | 0.06 | 2.23 | 1.08 | 0.37 | 13.4 |

The data of Examples 1, 2 and 3 show that when precipitated silica having the prescribed relationship of chloride, sulfate, sodium and calcium ions described herein is incorporated into silicone rubber, the percent of water volume swell is less than 4.

EXAMPLE 4

Run A

An aqueous slurry of crude precipitated high structure silica produced by neutralization of an aqueous solution of sodium silicate with carbon dioxide was extensively washed with tap water in the laboratory to reduce the inorganic salt content to a level well below that obtained in typical commercially produced samples. The washed slurry was filtered. About 20 kilograms of the resulting filter cake was dried at 140° C. in a rotary drier. The dried silica product was analyzed for sulfate, chloride, calcium and sodium ion by the methods described in Example 1. The BET surface area of this dried silica product was 156 square meters per gram. Results are tabulated in Table II.

Run B 20 kilograms of the precipitated silica filter cake prepared in Run A was reslurried with 55 liters of an aqueous solution saturated with calcium oxide. The diluting calcium oxide solution was prepared by adding an excess of calcium oxide to distilled water (1.4 grams calcium oxide/liter). The slurry was stirred for one hour and permitted to settle. The supernatant calcium oxide-containing solution was used in this and succeeding runs in the manner herein described.

The reslurried precipitated silica filter cake was stirred for one hour and allowed to stand over a weekend. Thereafter, the slurry was stirred and about ⅓ (25 liters) filtered. The filter cake was washed with 6 liters of the calcium oxide-containing solution. The washed filter cake was dried at 140° C. in a rotary drier. The dried product had a BET surface area of 129 square meters per gram. A pH of a 5 weight percent slurry of the dried pigment was 9.2. The dried silica product was analyzed for sulfate, chloride, sodium and calcium ion in the manner described in Example 1. Results are tabulated in Table II.

Run C

The remaining 2/3 of the precipitated silica slurry diluted with calcium oxide aqueous solution from Run B (about 50 liters) was permitted to settle for 6 hours. The resulting supernatant liquid (about 20 liters) was pumped off and the remaining settled volume (about 30 liters) was diluted with 20 liters of the saturated calcium oxide-containing aqueous solution. This slurry was stirred and about ½ (25 liters) filtered. The resulting filter cake was washed with 6 liters of the saturated calcium oxide-containing aqueous solution and the washed silica dried at 140° C. in a rotary drier. The BET surface area of the dried product was 125 square meters per gram. A 5% slurry of the dried product had a pH of 9.35. The dried silica product was analyzed for sulfate, chloride, sodium and calcium ion in the manner described in Example 1. Results are tabulated in Table II.

Run D

The 25 liters of slurry remaining from Run C was allowed to stand overnight. The supernatant liquid (about 5 liters) was removed and replaced with 5 liters of the saturated calcium oxide-containing aqueous solution. The resulting slurry was stirred and filtered. The filter cake was washed with 6 liters of the saturated calcium oxide aqueous solution and the washed product dried at 140° C. in a rotary drier. The BET surface area of the dried product was 124 square meters per gram. The pH of a 5% slurry of the dried pigment was 9.4. The dried silica product was analyzed for sulfate, chloride, sodium and calcium ion in the manner described in Example 1. Results are tabulated in Table II.

EXAMPLE 5

Silicone rubbers were prepared in the manner described in Example 1 using each of the dried silica products of Runs A, B, C, and D of Example 4 except that the silica-silicone gum-plasticizer-peroxide mixture was press cured at 170° C. for 10 minutes. The resulting silicone rubbers were tested for water volume swell and wet dielectric strength (WDS) in accordance with the ASTM methods described in Example 1. The results obtained are tabulated in Table II.

TABLE II

| Run | Surface Area m²/g | pH | NaCl, Wt. % | Na₂SO₄, Wt. % | Na₂O, Wt. % | CaO, Wt. % | Water Swell, % | WDS Volts/mil |
|---|---|---|---|---|---|---|---|---|
| A | 156 | 7.2 | 0.08 | 0.70 | 0.41 | 0.39 | 2.1 | 384 |
| B | 129 | 9.2 | 0.02 | 0.14 | 0.62 | 1.85 | 0.0 | 419 |
| C | 125 | 9.35 | 0.02 | 0.13 | 0.83 | 1.91 | 0.5 | 440 |

TABLE II-continued

| Run | Surface Area m²/g | pH | NaCl, Wt. % | Na2SO4, Wt. % | Na2O, Wt. % | CaO, Wt. % | Water Swell, % | WDS Volts/mil |
|---|---|---|---|---|---|---|---|---|
| D | 124 | 9.4 | 0.02 | 0.11 | 0.85 | 1.93 | 0.5 | 417 |

The data of Examples 4 and 5 demonstrate that the addition of calcium ion to a precipitated silica pigment significantly reduces the percent water volume swell and improves significantly the wet dielectric strength of a silicone rubber in which the calcium-treated precipitated silica is incorporated. In addition, the data show that extensive washing of a precipitated high structure silica to reduce the total salt content to low levels is instrumental in reducing the percent water volume swell to values below 4 percent.

EXAMPLE 6

Run A 20 kilograms of the precipitated silica filter cake prepared in Run A of Example 4 was reslurried with 55 liters of distilled water containing 3.36 grams barium oxide per liter (hereinafter saturated barium oxide solution). The resulting slurry was stirred for one hour and permitted to stand overnight. The following morning, the slurry was stirred and ⅓ of the slurry (about 25 liters) was filtered. The resulting filter cake was washed with 6 liters of the saturated barium oxide solution and dried at 140° C. in a rotary drier. The dried product had a BET surface area of 123 square meters per gram. A 5% slurry of the dried silica had a pH of 9.1. The dried silica product was analyzed for sulfate, chloride, sodium, calcium and barium ion in the manner described in Example 1. Results are tabulated in Table III.

Run B

The remaining ⅔ of the slurry (about 50 liters) from Run A of this Example was permitted to settle for 6 hours. The supernatant liquid (about 18 liters) was removed and replaced with 18 liters of the saturated barium oxide aqueous solution. The resulting mixture was stirred and ½ (about 25 liters) filtered. The filter cake was washed with 6 liters of saturated barium oxide solution and dried at 140° C. in a rotary drier. The surface area of the dried product was 116 square meters per gram. The pH of a 5% slurry of the dried product was 9.5. The dried silica product was analyzed for sulfate, chloride, sodium, calcium and barium ion in the manner described in Example 1. Results are tabulated in Table III.

Run C

The remaining 25 liters of slurry from Run B was permitted to settle over a weekend. The supernatant liquid (about 7 liters) was removed and replaced with 7 liters of saturated barium oxide aqueous solution. The resulting mixture was stirred and filtered. The filter cake was washed with 6 liters of the barium oxide aqueous solution and the washed product dried in at 140° C. in a rotary drier. The surface area of the dried product was 111 square meters per gram. A 5% slurry of the dried product had a pH of 9.6. The dried product was analyzed for sulfate, chloride, sodium, calcium and barium ions in the manner described in Example 1. Results are tabulated in Table III.

EXAMPLE 7

Silicone rubbers were prepared in the manner described in Example 1 using each of the dried silica products from Runs A, B, and C of Example 6. The resulting silicone rubber was tested for water volume swell and wet dielectric strength. Results are tabulated in Table III.

TABLE III

| Run | Surface Area m²/g | pH | NaCl, Wt. % | Na2SO4, Wt. % | Na2O, Wt. % | CaO, Wt. % | BaO, Wt. % | Water Swell, % | WDS, Volts/mil |
|---|---|---|---|---|---|---|---|---|---|
| A | 123 | 9.1 | 0.05 | 0.70 | 0.41 | 0.39 | 6.04 | 0.4 | 424 |
| B | 116 | 9.5 | 0.05 | 0.70 | 0.41 | 0.39 | 7.35 | 0.4 | 426 |
| C | 111 | 9.6 | 0.05 | 0.70 | 0.41 | 0.39 | 7.58 | 1.0 | 435 |

The results of Examples 6 and 7 show that the treatment of precipitated silica pigment with barium ion reduces the percent water volume swell and improves the wet dielectric strength of a silicone rubber in which the barium-modified precipitated silica is incorporated.

EXAMPLE 8

About 40 kilograms of a precipitated high structure silica filter cake obtained by filtering an aqueous slurry of precipitated silica prepared by neutralization of an aqueous solution of sodium silicate with carbon dioxide followed by post acidification to a pH of 3.7 with sulfuric acid was reslurried and diluted to 150 liters with distilled water. The resulting slurry was stirred for 30 minutes and allowed to settle overnight after heating the slurry to 70° C.

The first supernatant liquid was removed from the settle volume (about 80 liters) and distilled water added to make a total volume of 150 liters. The resulting slurry was stirred, heated to 70° C. and then allowed to settle for six hours. The second supernatant liquid was removed from the settled volume (about 80 liters) and distilled water added to make a total volume of 150 liters. The slurry was stirred, heated to 70° C. and allowed to settle overnight. The third supernatant was removed, leaving about 80 liters of settled slurry which had about 7 percent solids.

Run A

Ten liters of the final slurry was filtered and the filter cake dried in a rotary dryer at 140° C. This dried product had a surface area of 146 m²/g and a pH of 7.6 (5% slurry). It was analyzed for sulfate, chloride, sodium and calcium ions in the manner described in Example 1. Results are tabulated in Table IV.

Run B

Ten liters of the final slurry, which had a pH of 6.8 was diluted with 300 milliliters of an aqueous calcium acetate solution containing 110 grams of $Ca(C_2H_3O_2)_2 \cdot H_2O$ per liter. The resulting slurry was stirred for 30 minutes and had a pH of 6.8. The slurry was filtered and the filter cake dried in a rotary dryer at 140° C. The dried product had a surface area of 139 $m^2/g$ and a pH (5% slurry) of 7.3. It was analyzed for sulfate, chloride, sodium and calcium ions in the manner described in Example 1. Results are tabulated in Table IV.

EXAMPLE 9

Silicone rubbers were prepared in the manner described in Example 1 using each of the dried silica products from Runs A and B of Example 8. The resulting silicone rubber was tested for water volume swell and wet dielectric strength. Results are tabulated in Table IV.

TABLE IV

| Run | Surface Area $m^2/g$ | pH | NaCl, Wt. % | $Na_2SO_4$, Wt. % | $Na_2O$, Wt. % | CaO, Wt. % | Water Swell, % | WDS, Volts/mil |
|---|---|---|---|---|---|---|---|---|
| A | 146 | 7.6 | 0.01 | 0.29 | 0.51 | 0.34 | 1.4 | 345 |
| B | 139 | 7.3 | 0.01 | 0.27 | 0.42 | 0.69 | 1.7 | 379 |

The results of Examples 8 and 9 indicate that calcium acetate can be used to treat well washed precipitated silica. Although the acetate ion appears to increase water volume swell slightly, the wet dielectric strength was also increased.

In the following example, a low structure, precipitated silica was prepared in accordance with the procedure of U.S. Pat. No. 3,960,586.

EXAMPLE 10 (COMPARATIVE)

Sodium sulfate (4.2 kilograms) was added to a 100 liter vessel containing 37.85 liters of tap water to give a reaction medium containing 10% sodium sulfate. An aqueous sodium silicate solution having an $SiO_2/Na_2O$ weight ratio of 2.6 and a concentration of 2 pounds per gallon, and containing 7% sodium sulfate was added to the reaction medium until the pH was 9.0. The reaction medium was then heated to 65° C. (149° F.) and the sodium silicate solution and sulfuric acid of 11.4% concentration added to the reaction medium at the respective rates of 756 milliliters/minute and 453 milliliters/minutes so that a constant precipitation pH of 9.0 was maintained. After 30 minutes, the addition of sodium silicate was stopped. Excess sulfuric acid was added until the slurry pH reached 5.4. The slurry was heated to 77° C. (171° F.) and aged for 20 minutes. Sixteen liters of the resulting slurry were filtered. The filter cake contained about 1000 grams of silica.

The filter cake was reslurried with 12 liters of an aqueous calcium oxide-saturated solution containing about 0.84 grams/liter calcium. The reslurried suspension was stirred for 30 minutes and filtered. The filter cake was reslurried with 8 liters of the saturated calcium oxide solution, stirred for thirty minutes and filtered. A sample of this filter cake was found to contain 1.58% CaO and 1.46% $Na_2O$. Since the sodium level was above 1 percent, the filter cake was reslurried in 10 liters of distilled water and stirred for 30 minutes. The slurry was filtered and the filter cake dried in a forced air oven overnight at 105° C. The dried treated product had a BET surface area of 37 $m^2/G$, a pH (5% slurry) of 9.9 and the following analysis: <0.01 weight percent NaCl, 0.10 weight percent $Na_2SO_4$, 1.25 weight percent $Na_2O$, and 1.57 weight percent CaO, which were obtained by X-ray fluorescence spectroscopy.

A silicone rubber was prepared by mixing sixty parts of the aforesaid dried silica product with 100 parts of a methyl vinyl silicone gum (SWS Silicone Corp.-C-155), 6 parts of a plasticizer, 0.5 parts of a powdered peroxide (2,5-dimethyl-2,5-di(t-butylperoxy)hexane having 45% active peroxide and press curing the mixture at 170° C. for 10 minutes with a post cure of 1 hour at 250° C. It was apparent that the silica pigment did not adequately reinforce the silicone gum since the silicone gum-silica mixture continued to readily flow and did not form a rubbery-like mixture.

The resulting silicone rubber was tested for water volume swell, wet dielectric strength and certain rubber properties. The percent volume swell obtained was 4.9 percent. The wet dielectric strength was 394 volts/mil. The rubber properties of the resulting silicone rubber were compared to silicone rubber prepared using a fumed silica, a conventional high structure precipitated silica, and a high structure extensively washed precipitated silica. Results are tabulated in Table V.

TABLE V

| | | Silica | | |
|---|---|---|---|---|
| Physical Property | Example 10 | Fumed Silica[a] | High Structure Precipitated Silica | High Structure Extensively Washed Precipitated Silica |
| Modulus, 100%, psi | 20 | 250 | 190 | 190 |
| 300%, psi | 280 | —[b] | —[b] | —[b] |
| Ultimate Elongation, % | 360 | 280 | 270 | 270 |
| Tensile Strength, psi | 320 | 880 | 770 | 820 |
| Shore A Hardness | 32 | 74 | 59 | 59 |

[a] A commercially available fumed silica - prepared using only 50 parts of fumed silica.
[b] Data not obtained.

The data of Table V show that a low structure silica prepared in accordance with the process described in U.S. Pat. No. 3,960,586 yields a silica which is not useful as a reinforcing silica, since the silicone rubber had a very low hardness, little resistance to elongation and very low tensile strength.

Although the present invention has been described with reference to the specific details of particular embodiments in order to illustrate the invention, it is not intended to limit the scope of the invention thereto insofar as such details are set forth in the appended claims.

We claim:
1. Finely-divided amorphous, precipitated, high structure silica consisting essentially of at least 85 weight percent $SiO_2$ on an anhydrous basis, less than 2 weight percent of a water soluble alkali metal sulfate salt, less than 1 weight percent of a water soluble alkali metal chloride salt, and from about 0.05 to 5 weight percent of alkali metal oxide, the total amount of said alkali metal salts and oxide in said silica being from about 1 to about 5 weight percent, and having deposited on its surface the oxide of a metal selected from the group consisting of calcium, barium and mixtures of such metals in amounts sufficient to provide on said silica at least an equal molar amount of said metal based on the total amount of alkali metal present in the silica, said amount of metal being such that a silicone rubber reinforced with said silica as the principal silica filler exhibits a water volume swell of not more than 4 percent and a wet dielectric strength of at least 400 volts/mil.

2. The silica of claim 1 wherein the molar equivalent ratio of the metal to the alkali metal is from about 1:1 to about 2:1.

3. The silica of claims 1 or 2 wherein the alkali metal is sodium.

4. The silica of claim 3 wherein the silica contains less than 2 weight percent of a soluble sulfate salt, less than 0.5 weight percent of a soluble chloride salt, and less than 2 weight percent of alkali metal oxide, the total amount of said alkali metal salts and oxide in said silica being from about 1 to 3 weight percent and the water volume swell of the silicone rubber is less than 2 percent.

5. The silica of claim 4 wherein the metal is calcium and the relationship of the concentrations of the chloride, sulfate, sodium and calcium ionic species is expressed by the following:

$$\frac{4 - C_1[Cl^-] - C_2[SO_4^=] - C_3[Na^+]}{C_4} \leq [Ca^{++}]$$

wherein $C_1$, $C_2$, $C_3$ and $C_4$ are numerical coefficients which respectively vary from 8 to 12, 1 to 3, 9.5 to 14.5 and $-5.5$ to $-8.5$, and $Cl^-$, $SO_4^=$, $Na^+$ and $Ca^{++}$ are the weight percent of said ions in the silica expressed as sodium chloride, sodium sulfate, sodium oxide and calcium oxide.

6. The silica of claim 5 wherein the silica has a BET surface area of from about 120 to 160 square meters per gram.

7. The silica of claim 5 wherein the amount of calcium present in the silica, expressed as the oxide, is from about 0.5 to 3 weight percent.

8. A composition comprising silicone elastomer gum curable with a free radical generator and from 10 to 100 parts per 100 parts of silicone gum, of reinforcing, amorphous precipitated, high structure silica consisting essentially of at least 85 weight percent $SiO_2$ on an anhydrous basis, less than 2 weight percent of a water soluble alkali metal sulfate salt, less than 1 weight percent of a water soluble alkali metal chloride salt, and from about 0.05 to 5 weight percent of alkali metal oxide, the total amount of said alkali metal salts and oxide in said silica being from about 1 to about 5 weight percent, and having deposited on its surface the oxide of a metal selected from the group consisting of calcium, barium and mixtures of such metals in amounts sufficient to provide on said silica at least an equal molar amount of said metal based on the total amount of alkali metal present in the silica, said amount of metal being such that, when said silicone elastomer gum composition is cured, the resulting silicone rubber exhibits a water volume swell of not more than 4 percent and a wet dielectric strength of at least 400 volts/mil.

9. The silicone elastomer composition of claim 8 wherein the alkali metal is sodium and the ratio of molar equivalents to the alkali metal is from about 1:1 to about 2:1.

10. The silicone elastomer composition of claim 9 wherein the metal is calcium and the relationship of the concentrations of the chloride, sulfate, sodium and calcium ionic species is expressed by the following:

$$\frac{4 - C_1[Cl^-] - C_2[SO_4^=] - C_3[Na^+]}{C_4} \leq [Ca^{++}]$$

wherein $C_1$, $C_2$, $C_3$ and $C_4$ are numerical coefficients which respectively vary from 8 to 12, 1 to 3, 9.5 to 14.5 and $-5.5$ to $-8.5$, and $C^-$, $SO_4^=$, $Na^+$ and $Ca^{++}$ are the weight percent of said ions in the silica expressed as sodium chloride, sodium sulfate, sodium oxide and calcium oxide.

11. The silicone elastomer composition of claim 10 wherein the amount of calcium present in the silica, expressed as the oxide, is from about 0.5 to 3 weight percent.

12. The silicone elastomer composition of claims 8 or 10 wherein the amount of silica used ranges from 20 to 70 parts of silica per 100 parts of silicone gum.

13. A silicone rubber composition comprising the cured silicone elastomer gum of claim 8.

14. A silicone rubber composition comprising the cured silicone elastomer gum of claim 10 further characterized by having a water volume swell of less than 2 percent.

15. In the method of preparing amorphous, precipitated, high structure silica by acidulating an aqueous alkali metal silicate solution with inorganic acid, the improvement of preparing a precipitated, high structure silica useful for reinforcing silicone rubber, which comprises determining the total amount of alkali metal of the precipitated silica and in response to such determination, depositing on the surface of said precipitated silica metal oxide of a metal selected from the group consisting of calcium, barium and mixtures of such metals in amounts sufficient to provide on said silica at least an equal molar amount of said metal based on the total amount of alkali metal present in the silica, the amount of metal being such that a silicone rubber reinforced with said precipitated silica as the principal silica filler exhibits a water volume swell of not more than 4 percent and a dielectric strength of at least 400 volts/mil, and wherein the metal oxide is deposited from an aqueous solution of an ionizable oxide, hydroxide or $C_1$–$C_4$ carboxylic acid salt of said metals.

16. The method of claim 15 wherein the alkali metal is sodium and the molar equivalent ratio of the metal to sodium is from about 1:1 to about 2:1.

17. The method of claim 16 wherein the metal oxide is deposited on the precipitated silica by slurrying the silica in an aqueous solution of an ionizable or hydroxide of the metal.

18. The method of claim 16 wherein the metal oxide is deposited on the precipitated silica by washing a wet cake of the silica with an aqueous solution of an ionizable oxide or hydroxide of the metal.

19. In the method of preparing amorphous, precipitated, high structure silica by acidulating an aqueous sodium silicate solution with inorganic acid, the improvement of preparing a precipitated, high structure silica useful for reinforcing silicone rubber, which comprises determining the concentration of the chloride, sulfate and sodium ionic species in the silica and, in response to said determination, depositing an oxide of calcium on the surface of said precipitated silica from an aqueous solution of an ionizable oxide or hydroxide of calcium in amounts sufficient to satisfy the following relationship:

$$\frac{4 - C_1[Cl^-] - C_2[SO_4^=] - C_3[Na^+]}{C_4} \leq [Ca^{++}]$$

wherein $C_1$, $C_2$, $C_3$ and $C_4$ are numerical coefficients which respectively vary from 8 to 12, 1 to 3, 9.5 to 14.5 and $-5.5$ to $-8.5$, and $Cl^-$, $SO_4^=$, $Na^+$ and $Ca^{++}$ are the weight percent of said ions in the silica expressed as sodium chloride, sodium sulfate, sodium oxide and calcium oxide.

20. The method of claim 19 wherein the amount of calcium present on the silica, calculated as calcium oxide, is from about 0.5 to 3 weight percent.

21. The method of claims 19 or 20 wherein the calcium oxide is deposited on the precipitated silica by slurrying the silica in an aqueous solution of the oxide or hydroxide of calcium.

22. The method of claims 19 or 20 wherein the calcium oxide is deposited on the precipitated silica by washing a wet cake of the silica with an aqueous solution of the oxide or hydroxide of calcium.

* * * * *